Figure 1:
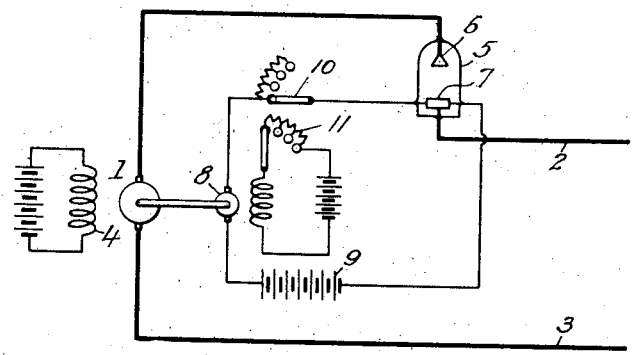

Jan. 16, 1923.

F. W. MEYER.
CONTROLLING AND REGULATING APPARATUS.
ORIGINAL FILED JAN. 13, 1917.

1,442,728

2 SHEETS-SHEET 1

Inventor
Friedrich W. Meyer
By Edwin B. H. Tower Jr.
Atty.

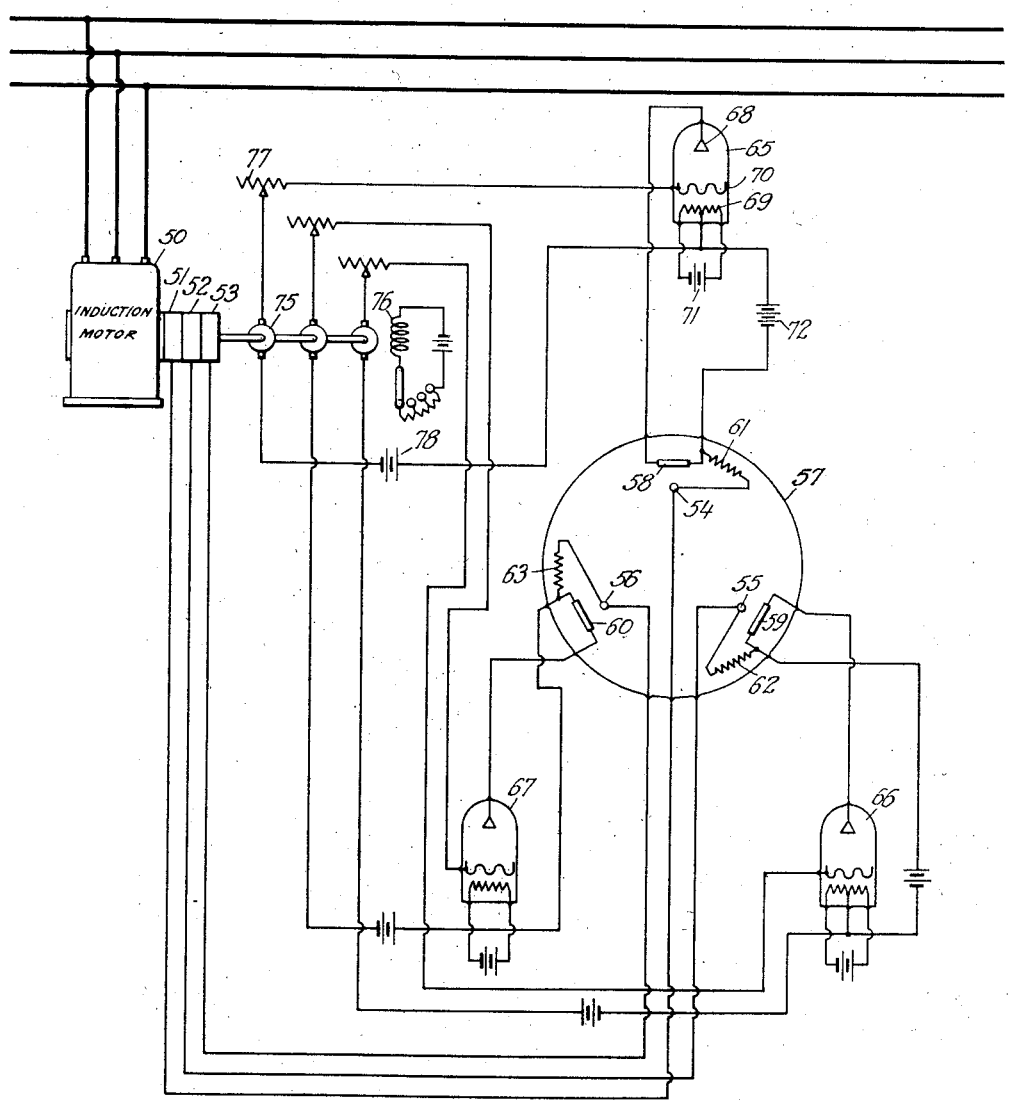

Patented Jan. 16, 1923.

1,442,728

UNITED STATES PATENT OFFICE.

FRIEDRICH WILHELM MEYER, OF MILWAUKEE, WISCONSIN, ASSIGNOR TO THE CUTLER-HAMMER MFG. CO., OF MILWAUKEE, WISCONSIN, A CORPORATION OF WISCONSIN.

CONTROLLING AND REGULATING APPARATUS.

Original applications filed January 13, 1917, Serial No. 142,243, and January 21, 1918, Serial No. 212,947. Divided and this application filed March 28, 1918. Serial No. 225,299.

*To all whom it may concern:*

Be it known that I, FRIEDRICH WILHELM MEYER, a citizen of the German Empire, residing at Milwaukee, in the county of Milwaukee and State of Wisconsin, have invented new and useful Improvements in Controlling and Regulating Apparatus, of which the following is a specification.

This invention relates to controlling and regulating apparatus.

More particularly it relates to controlling and regulating apparatus for energy converters, such, for example, as dynamo electric machines.

This application is a division of my copending application, Ser. No. 142,243, filed Jan. 13, 1917, (Patent No. 1,353,815, granted September 21, 1920) and also of my copending application, Ser. No. 212,947, filed Jan. 21, 1918 (Patent No. 1,411,862, granted April 4, 1922).

When certain dynamo electric machines, for example, electric motors, are subjected to variations in operating conditions, such as variations in load or in impressed voltage, their speed will vary unless regulating means are provided to compensate and correct for these variations in operating conditions. Electro-magnets, switches and resistances are ordinarily the means through which a motor and other dynamo electric machines are regulated. The self-induction of the electro-magnets, the mechanical inertia of the switches, the inertia and self-induction of the motor and other things tend to make the regulation tardy and cause it to overrun and hunt. Some of the forms of regulating apparatus heretofore suggested depend for their operation upon the oscillation of the corrective force which necessarily favors the tendency to hunt and increases the instability of the system. When resistances are used considerable energy is wasted.

One of the objects of the present invention is to produce more sensitive, stable and efficient regulation.

Another object is to provide improved regulating means whereby the tendencies to hunt and oscillate are eliminated or lessened.

Another object is to provide improved regulating means which will respond to slight variations in operative conditions and accurately compensate therefor.

Another object is to provide improved facilities for controlling the speed and torque of an electric motor.

Other objects and advantages will appear from the following specification and claims.

In the accompanying drawings certain embodiments of the invention are diagrammatically illustrated and will be herein explained as applied to the control and regulation of electric motors, but the invention is readily susceptible of other embodiments and of being adapted to control and regulate other types of dynamo electric machines.

In accordance with the embodiments of the invention illustrated the motor is regulated primarily through the agency of an electroionic valve, the effect of which is thermally controlled by means which respond under variations in load or other operating conditions.

In the drawings Fig. 1 shows the apparatus applied to a direct current motor.

Figure 2:
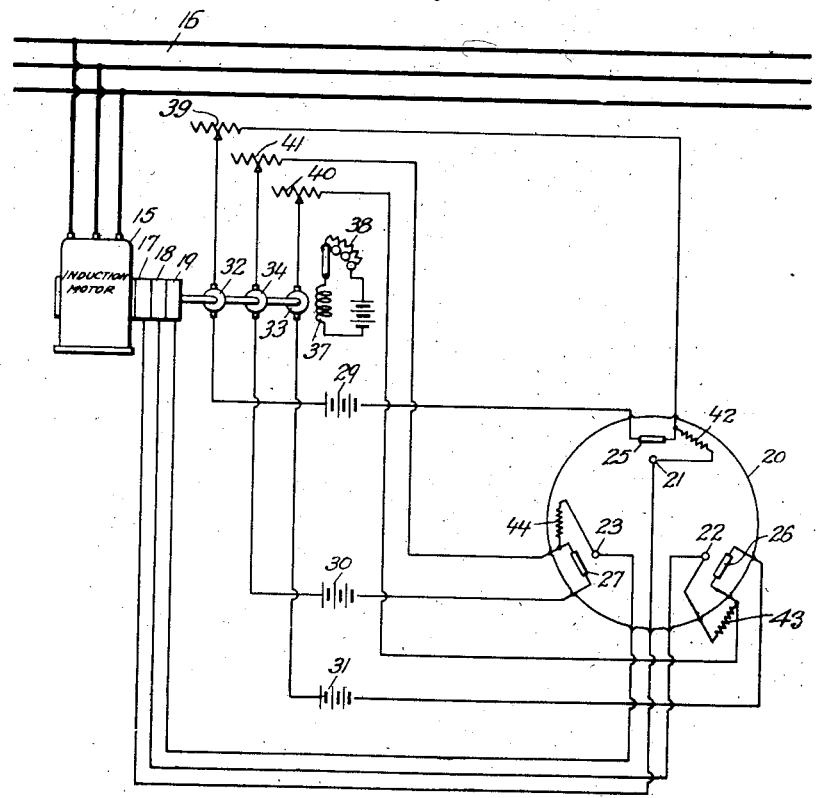

Fig. 2 shows a modification wherein the apparatus is used in connection with a three-phase induction motor, and Fig. 3 shows another modification wherein the electroionic valve is controlled by auxiliary electroionic valves or relays to give increased corrective effects.

Fig. 1 will first be described. A direct current motor 1 is supplied with energy from a source 2—3 and is provided with a separately excited field 4. The energy is transmitted to motor 1 through an electroionic valve 5 which may be of either the dark discharge, the luminous discharge or the arc discharge type. This electroionic valve is described and its characteristics of operation are explained in the hereinbefore mentioned Patent No. 1,353,815. It has an anode 6 and a cathode 7. The amount of energy supplied to the motor depends upon the character of the discharge between anode 6 and cathode 7, and the character of this discharge may be varied by varying the temperature of the cathode.

The temperature of the cathode 7 is varied by varying the flow of an auxiliary or heating current flowing therethrough. Connected to and simulating the operation of motor 1 is a small direct current dynamo electric machine or tachometer 8. The armature of tachometer 8 is connected to the terminals of cathode 7 through a battery 9 and an adjustable resistance 10. Tachometer 8 has a separately excited field which may be controlled by a rheostat 11. Battery 9 and tachometer 10 are connected in opposition, the battery voltage normally predominating. An increase in the voltage of the tachometer will therefore decrease the difference in voltage between the battery and the tachometer and less current will flow through the circuit including the cathode 7. The temperature of cathode 7 will thereupon be reduced and the amount of energy supplied to the motor 1 will be decreased. A decrease in the voltage supplied by the tachometer produces the opposite result.

If the speed of the motor, due to variations in load or line voltage, etc. decreases, the speed of the tachometer is similarly and coincidently or simultaneously decreased and the voltage produced thereby is decreased. The difference in voltage between battery 9 and tachometer 8 is therefore increased, more current flows through cathode 7 and more energy is supplied to motor 1. The speed of the motor therefore increases to compensate for the variation. On the other hand, an increase in the speed of the motor increases the speed and voltage of the tachometer. The difference in voltage between the battery and the tachometer decreases, less current is supplied to cathode 7 and the temperature of the cathode decreases. Less current thereupon is supplied to motor 1 and the motor speed decreases.

The initial speed and torque conditions may be readily controlled by varying the excitation of the tachometer field through rheostat 11, or by varying the resistance in the circuit of cathode 7 by means of rheostat 10. It is of course also possible to obtain various characteristic speed curves by bringing the field of the tachometer under the influence of the load current.

Fig. 2 shows an induction motor 15 with its primary or stator connected directly to a source of three-phase alternating current 16. The secondary or rotor windings of the motor are brought out to slip rings and brushes 17, 18 and 19 in the usual manner. The motor is regulated and controlled by varying the effective voltage of the rotor, which voltage is varied by a special type of duplex electroionic valve 20.

Electroionic valve 20 comprises three electrodes 21, 22 and 23 which are connected respectively to the motor brushes and slip rings 17, 18 and 19. As will be hereinafter explained each of the electrodes 21, 22 and 23 may act and in operation do function alternately as an anode and as a cathode. The electroionic valve 20 is also provided with supplementary cathodes 25, 26 and 27 located in close proximity to the electrodes 21, 22 and 23 respectively.

The supplementary cathodes 25, 26 and 27 are heated by current supplied from batteries 29, 30 and 31 respectively. The amount of current supplied to and consequently the degree of heat of the cathodes 25, 26 and 27 is controlled by small direct current generators or tachometer machines 32, 33 and 34 respectively. The batteries 29, 30 and 31 and the corresponding tachometers 32, 33 and 34 are so connected in circuit that their voltages are opposed, the voltages of the batteries normally predominating.

The tachometers are connected directly to the motor shaft and thus simulate the operating condition of the motor. Therefore when the speed of the motor decreases the tachometers produce a small voltage, the difference in voltage between the batteries and tachometers consequently increases and more current is supplied to heat the supplementary cathodes 25, 26 and 27.

The tachometers have a common separately excited field 37 which can be controlled at will through a rheostat 38. The current to the cathodes can also be controlled by adjustable resistances 39, 40 and 41 respectively located in the various circuits of the tachometers and cathodes 25, 26 and 27. Between one terminal of the supplementary cathodes and the corresponding electrodes 21, 22 and 23 small resistances 42, 43 and 44 are connected. These resistances may be located within the vessel as illustrated for resistances 42 and 44 or outside of the vessel as shown for resistance 43. It has also been found that good results may be obtained by placing batteries in series with the resistances 42, 43, and 44 or by substituting batteries for these resistances and removing the resistances entirely.

The operation is as follows: The load current in the motor primary induces voltages in the motor secondary windings which successively pass through cycles corresponding to the line cycles. It will therefore be apparent that the potential between the electrodes 21, 22 and 23 passes through corresponding cycles creating a rotary discharge in vessel 20. For example, the arc may first pass between electrodes 21 and 22, electrode 21 acting as an anode and electrode 22 as a cathode. This arc after starting builds up to a maximum and then falls off as the induced voltage in the corresponding winding of the motor secondary decreases. As the arc between electrodes 21 and 22 falls off the potential between electrodes 22 and 23 is building up, and, after the extinguishing of the arc between electrodes 21 and 22 an arc is started between electrodes 22 and 23 when the critical or ignition voltage is reached. Electrode 22 is now an anode and electrode 23 a cathode. Next the arc passes between electrodes 23 and 21, electrode 23 being the anode and electrode 21 being the cathode. This cycle of operations continues during the operation of the motor, the frequency of the changes corresponding to the frequency of the motor secondary which depends upon the slip of the motor.

In order to facilitate the formation of the arcs, to sharply define the arcs and to provide regulation and control, the supplmentary cathodes are employed. The arc from anode 21 first forms between anode 21 and auxiliary cathode 26, the discharge between these electrodes taking place at a voltage lower than that required to force an arc between electrodes 21 and 22. The arc once started between anode 21 and cathode 26 readily shifts to electrode 22. The arc between anode 21 and cathode 26 is almost immediately extinguished because when once started through electrode 22 the resistance of the path directly between electrodes 21 and 22 is less than that between 21 and 22 through cathode 26 on account of the resistance 43. Similarly the arc from electrode 22 first starts between that electrode and auxiliary cathode 27, later shifting to electrode 23.

By regulating and controlling the heating of the auxiliary cathodes 25, 26 and 27 the formation of the arcs between the electrodes 21, 22 and 23 and the auxiliary cathodes can be varied and consequently the formation of the arcs between the main electrodes can be regulated and controlled. If the motor speed, for any reason, decreases, the voltages of the tachometer machines simultaneously decrease. The difference of potential between the tachometers and batteries 29, 30 and 31 immediately increases and more current is supplied to the auxiliary cathodes. The heat of these cathodes is accordingly increased, the arcs from electrodes 21, 22 and 23 to the auxiliary cathodes and consequently also between these main electrodes takes place sooner and also the cathode voltage or corresponding ionization voltage increases. Thus the voltage consumed in the vessel 20 is diminished and the voltage of the motor secondary circuit increased. This increase in voltage raises the motor speed.

An increase in motor speed brought about by variations in voltage drops, load, etc., has the opposite effect. The tachometers then generate higher voltages, the difference in voltages between the tachometers and the batteries are decreased and less current is supplied to the auxiliary cathodes. The temperature of the auxiliary cathodes decreases and consequently the formation of the arcs in vessel 20 is less easily accomplished and maintained. Therefore the effective voltage of the motor secondary is decreased and the motor speed decreases.

The corrective effects thus applied are greatly augmented or increased by the characteristic action of the electroionic valve and may take place practically simultaneously with any deviation in motor operation. Stable and close regulation may thus be obtained. The speed and torque of the motor may be readily varied by the manipulation of the tachometer field or variable resistances, 39, 40 and 41.

Fig. 3 shows a similar arrangement, the corrective effects being increased or augmented by the use of auxiliary electronic valves or relays or other electroionic valves or relays. A motor 50 has its primary windings directly connected to the line and has slip rings and brushes 51, 52 and 53. The slip rings and brushes are connected respectively to three main electrodes 54, 55 and 56 of an electroionic valve 57 as before. Each main electrode has associated therewith a supplementary cathode 58, 59 and 60 respectively. Between the electrodes 54, 55 and 56 and the corresponding auxiliary cathodes 58, 59 and 60 are connected small resistances 61, 62 and 63 respectively.

Each auxiliary cathode is respectively heated by currents supplied through an electronic relay 65, 66 and 67. Since all of the relays are alike and function in the same way only one need be described. Relay 65 has an anode 68, a cathode 69 and an auxiliary anode 70 which may take the form of a grid. Cathode 69 is heated by current from a battery 71. A battery 72 is connected in circuit between one terminal of auxiliary cathode 58 of valve 57 and middle of cathode 69. The other terminal of auxiliary cathode 58 is connected to anode 68 of relay 65. Battery 72 supplies the current for heating auxiliary cathode 58, and the amount of current thus supplied is determined by the voltage consumed in relay 65.

Driven by the motor to simulate the operation thereof is a direct current tachometer machine 75. Tachometer machine 75 has an adjustably separately excited field 76. One brush of the tachometer machine 75 is connected to the auxiliary anode 70 of relay 65 through an adjustable resistance 77, the other brush of the tachometer being connected in series with a battery 78 to the middle of cathode 69 of relay 65. The voltages of battery 78 and tachometer 75 oppose each other and normally the voltage of the battery predominates.

As previously explained in connection with Fig. 2 the arcs in vessel 57 start between the main electrodes and the auxiliary cathodes and then pass between the main electrodes in rotation. The heat of the auxiliary cathodes determined the point of the starting and also the character of the arcs and consequently the resistance of the motor secondary circuit.

If the speed of the motor decreases for any reason the tachometer machine 75 simultaneously produces less voltage. The difference in voltage between battery 78 and tachometer machine 75 consequently increases and the voltage between auxiliary anode 70 and cathode 69 of relay 65 increases. The voltage consumed in relay 65 thereupon decreases resulting in battery 72 supplying more current to auxiliary cathode 58 of valve 57. The arc between electrode 56 and auxiliary cathode 58 and consequently between electrodes 56 and 54 accordingly forms more readily and is maintained more easily, the resistance of the motor secondary circuit is decreased and the motor increases in speed.

Slight variations in motor speed cause relay 65 to produce greatly magnified effects upon auxiliary cathode 58 which therefore magnifies the effects upon the arc in the valve 57. Each relay has a tachometer machine so that the effects on all of the auxiliary cathodes 58, 59 and 60 are simultaneously applied so that corrective effects are immediately produced regardless of the electrodes between which the arc is passing at the time corrective forces are required.

The speed and torque of the motor may be controlled at will by means of the rheostat in the motor field or the resistances in the circuit between the tachometer and the auxiliary anodes of relays 65, 66 and 67.

It has been found by experiment that the resistances between the main electrodes and the heated or auxiliary cathodes may be omitted with satisfactory results.

What I claim is:

1. A regulator for a dynamo electric machine subject to varying conditions of energy conversion, comprising an electroionic valve having electrodes included in a circuit traversed by the current which controls the operation of the machine, a current supply circuit connected to one of the electrodes whereby said electrode may be heated, and means simultaneously responsive to the varying conditions and controlling the current passing through said heated electrode to vary the temperature thereof in accordance with the varying conditions to control the regulating effect of the valve.

2. A regulator for a machine for converting energy and subject to varying load and power conditions, comprising an electroionic valve having electrodes included in a circuit traversed by the current which controls the operation of the machine, current supply connections for one of the electrodes whereby said electrode may be heated, a tachometer simulating the operation of the machine and electrically and frictionlessly interlinked with the current supply connections and controlling the current passing through said heated electrode to vary the temperature thereof in accordance with the varying conditions to control the regulating effect of the valve.

3. The combination of a dynamo electric machine to be regulated for varying conditions of voltage, load and power, an auxiliary dynamo electric machine simulating the operation of the machine to be regulated and creating an electromotive force changing with the varying conditions, an electroionic valve having a plurality of electrodes, means connecting the auxiliary machine in circuit with one of the electrodes so that the heating current therethrough is varied coincidently and in accordance with the varying conditions, and circuit leads connecting electrodes of the valve to the machine to be regulated whereby regulative effects are impressed upon the same in substantial synchronism with the varying conditions.

4. Regulating means for dynamo electric machines subject to varying load and power conditions, comprising an electroionic valve provided with electrodes through which the current which controls the operation of the machine is transmitted, current supply connections to one of said electrodes, and means coincidently responsive to the varying conditions and changing the temperature of said last mentioned electrode by changing the current passing through the said connections.

5. The combination of a dynamo electrical machine subject to varying conditions of voltage, load and power, an electroionic valve having a plurality of electrodes for controlling said machine, the discharge between said electrodes being controlled by varying the temperature of one electrode, and means simulating the operating conditions of said machine and coincidently responsive to the varying conditions and supplying varying amounts of heating current to one of the electrodes of said valve.

6. In a system of electrical distribution in which there is a dynamo electric machine to be controlled for varying load and power conditions and an electroionic valve for controlling it, the combination of means for supplying current to heat one of the electrodes the temperature of which controls the quantity of the discharge thereof, and a controlling circuit in which the machine to be controlled substantially instantaneously produces an effect which changes the heating current in substantial synchronism with the varying conditions to alter the discharge, thereby to control the machine.

In witness whereof, I have hereunto subscribed my name.

FRIEDRICH WILHELM MEYER.